United States Patent [19]

Scott

[11] 4,192,976

[45] Mar. 11, 1980

[54] PUSHBUTTON CALL TRANSMITTER

[75] Inventor: James Scott, Huntsville, Ala.

[73] Assignee: GTE Automatic Electric Laboratories Incorporated, Northlake, Ill.

[21] Appl. No.: 974,398

[22] Filed: Dec. 29, 1978

[51] Int. Cl.[2] .............................................. H04M 1/50

[52] U.S. Cl. .............................. 179/90 K; 340/365 S; 200/5 A; 200/159 A

[58] Field of Search ............ 179/90 K; 200/5 A, 5 R, 200/6 R, 6 C, 16 A, 159 R, 159 A, 16 C; 340/365 R, 365 S

[56] References Cited

U.S. PATENT DOCUMENTS

| | | | |
|---|---|---|---|
| 3,800,104 | 3/1974 | Lien et al. | 200/159 A |
| 3,870,840 | 3/1975 | Rivetta et al. | 179/90 K |
| 3,909,564 | 9/1975 | Scheingold et al. | 200/5 A |
| 4,005,293 | 1/1977 | Boulanger | 200/5 A |
| 4,059,737 | 11/1977 | Gergaub | 200/5 A |
| 4,074,088 | 2/1978 | Kedugh et al. | 340/365 R |
| 4,129,763 | 12/1978 | Murata | 200/5 A |

*Primary Examiner*—Gerald Brigance
*Attorney, Agent, or Firm*—Robert J. Black

[57] ABSTRACT

A calling device usable in telephone subscribers' instruments to selectively close a set of contacts upon the depression of one of a plurality of upwardly biased pushbuttons. The device is adapted to be assembled modularly and includes an integrated switching module arranged as an unitary assembly. A plurality of one piece spring and contact members within the switching module serve to restore each pushbutton and provide a single "make" contact with an included contact strip whenever an individual pushbutton is depressed. Formed wiper contact ends of each spring and contact member and contact strip, electrically connect to a circuit board which is disposed to engage a rear face of the switching module. The front face accepts a faceplate and pushbutton assembly which is keyed to the switching module and is easily removed and replaced without disassembling the entire calling device.

13 Claims, 4 Drawing Figures

PUSHBUTTON CALL TRANSMITTER

BACKGROUND OF THE INVENTION

1. Field of the Invention

This invention relates generally to a switching apparatus for transmitting a plurality of signals, and more particularly to an improved construction for a pushbutton call transmitter.

2. Description of the Prior Art

The use of pushbutton calling devices associated with telephone subscribers instruments equipped for operation in automatic telephone systems is well known. Some of the earliest versions of this signalling technique where utilized even prior to the development of the conventional dial, now long used for controlling switching paths in the telephone network.

Most recently it has become conventional to equip telephone subscribers instruments for touchcalling service with pushbutton call transmitters using oscillator circuitry capable of producing on a selective basis two tone signals simultaneously in response to a single operation of one of a group of included pushbuttons. Each tone pair generated is recognizable by the telephone central office as representative of a single selected digit. Two particular disadvantages of this form of signalling was a requirement for inclusion of a common switch and the need for more than one frequency selection switch contact associated with each pushbutton. Frequency selection was accomplished by including two contacts per pushbutton or the utilization of mechanical coding linkages. The common switching function was accomplished by mechanically coupling all pushbuttons to a single switch, or by adding switch contacts to each pushbutton. Such methods of code selection and common switch operation were costly to implement from a mechanical viewpoint. Likewise, the reliability of such arrangements has also been a problem.

Advances in integrated circuit technology have produced digital touch-calling encoders which generate telephone standard multi-frequency tones in response to digital inputs. Such encoders are taught by U.S. Pat. No. 3,761,642 to Paul V. Lind, and exemplified by the MK5085N integrated tone dialer, available commercially by the Mostek Corporation. These devices require only a single make contact to produce a multi-frequency tone required for dialing. This advance in dialing technology has lead to the incorporation of simpler more reliable pushbutton switching arrangements to telephone instruments which are commonly known as Class A keyboards and more typically used with handheld calculators and computer keyboard devices.

Realistically, telephone call transmitters must be manufactured to withstand thousands of individual pushbutton switching operations over the life of the telephone instrument. A failure in any one of the included pushbuttons would render the entire call transmitter useless. It becomes desirable not only to manufacture a simpler pushbutton call transmitter for reliability, but also to be able to assemble the call transmitter with a certain degree of modularity, where, if one part of the assembly, i.e. the switching contacts or the electronic components would fail only that element of the assembly would be discarded and replaced and not the entire assembly. Further this modularity may be also used to advantage in manufacturing a standard sealed contact switching unit, to which many different types of pushbuttons, and faceplates may be applied, such as special vandal proof pushbuttons and faceplates for coin operated telephones. Additionally, if the electronic components are carried on a standard circuit board adapted to electrically connect to the contact switching unit it would be a matter of substituting one type of circuit board of a particular telephone operating characteristic for another. An example of this technique would be in converting from DTMF dialing to electronic pulse dialing and vice versa.

Accordingly, it is the object of the present invention to provide a pushbutton call transmitter for use in telephone instruments which requires only a single make switch contact associated with each pushbutton.

It is a further object of the present invention to provide an improved construction for a pushbutton call transmitter which exhibits a degree of modularity between the functional elements of the assembly.

SUMMARY OF THE INVENTION

The pushbutton call transmitter according to the principles of the present invention is comprised of three distinct functional sub-assemblies, an integrated switching module, a pushbutton faceplate and pushbuttons and a circuit board carrying the required signalling circuitry.

The integrated switching module is the heart of the pushbutton call transmitter and includes a frame which also serves as the main structural element of the call transmitter assembly. The frame includes a plurality of apertures arranged in columns and rows with each aperture adapted to accept an individual pushbutton therethrough. Also included is a bearing guide having a plurality of apertures with each aperture centrally located to an individual frame aperture and an electrostatic shield structurally identical to the bearing guide. The bearing guide and electrostatic shield are keyed to the frame avoiding assembly errors and provides proper alignment of the frame, bearing guide and shield apertures. A backplate which is also keyed to the frame carries a plurality of contact strips having formed wiper contact ends which are adapted to make contact with the circuit board. Sandwiched between the backplate and the bearing guide are a plurality of contact spring members with each contact spring member having several formed tabs (one for each pushbutton) which serve to restore the pushbutton. Each formed tab also includes a tongue portion which makes contact with a respective backplate contact strip whenever a button is depressed. Each contact spring member further includes a formed wiper contact end which is arranged to make contact with the curcuit board. The backplate is secured to the frame by the use of threaded fasteners or other fastening techniques of a more permanent nature such as heat-staking or the like. In this fashion, the integrated switching module becomes a unitary mechanical switching unit and needs only the incorporation of a faceplate and pushbuttons and a circuit board to complete the call transmitter assembly.

The faceplate includes a plurality of apertures arranged in columns and rows and adapted to accept an individual pushbutton therethrough. Each pushbutton includes an operating section which is guided by the faceplate and an actuating section which is disposed to be inserted within a respective bearing guide aperture. The faceplate further includes alignment members which are adapted to be inserted into alignment cavities on the frame so as to properly locate each pushbutton to an individual frame aperture. The faceplate is secured to the integrated switching module by threaded fasteners which are inserted through counter-sunk holes on the backplate, and secured to threaded bores on the faceplate. Each formed tab of the contact spring members normally biases an individual pushbutton upwardly and is adapted to be downwardly deflected when each pushbutton is operated, urging its associated tongue into contact with a contact strip completing a signal path.

The call transmitter assembly is completed by installing a circuit board to the frame designed for easy removal and replacement by a snap-on, snap-off feature. The wiper contact ends of the contact strips and contact spring members extend through the backplate to engage respective contact areas on the circuit board establishing a spring-loaded electrical connection when the circuit board is snaped-on the frame.

BRIEF DESCRIPTION OF THE DRAWINGS

A better understanding of the invention may be had from the consideration of the following detailed description taken in conjunction with the accompanying drawings in which.

DESCRIPTION OF THE PREFERRED EMBODIMENT

Figure 1:
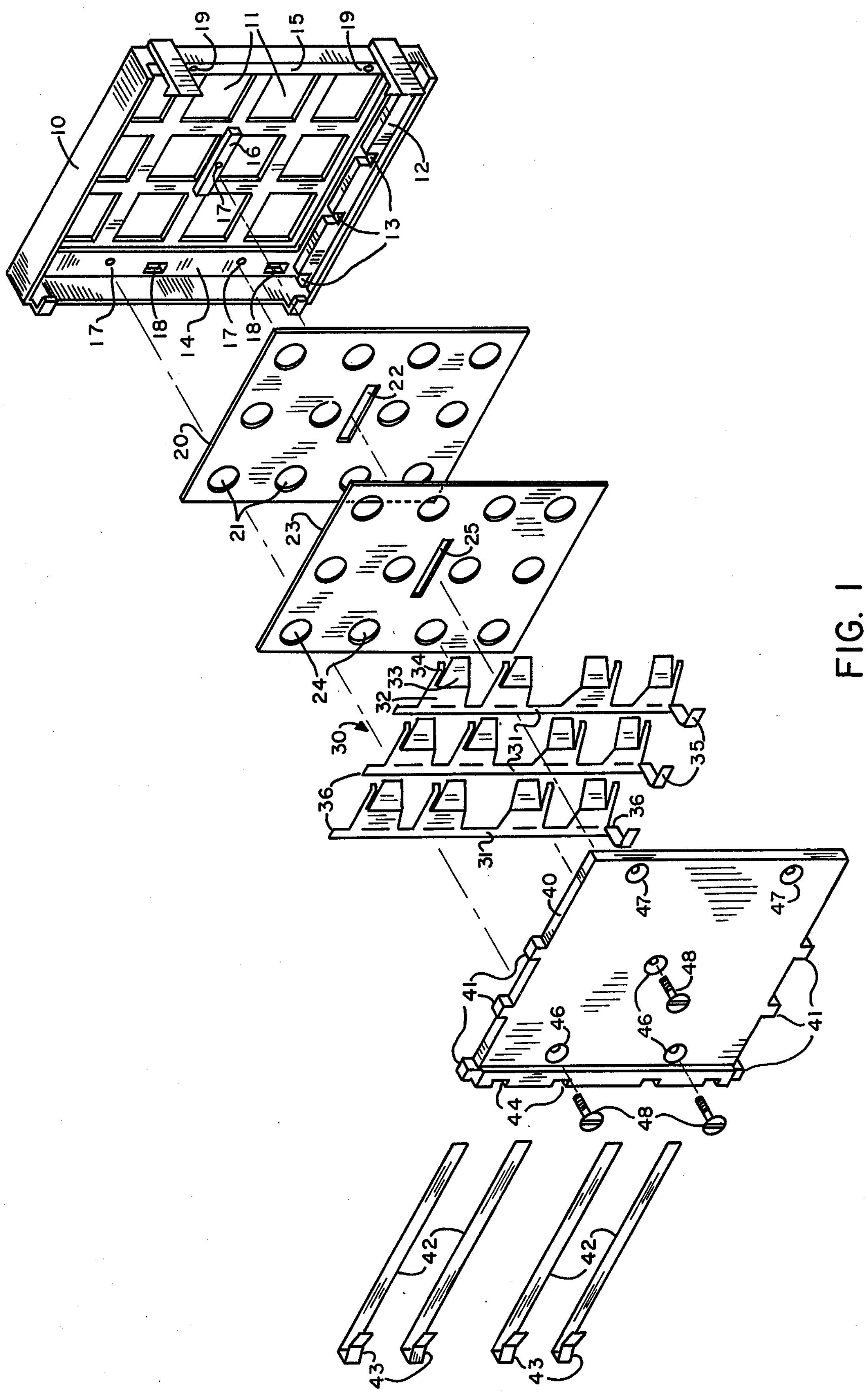
FIG. 1 is an exploded perspective view of the integrated switching module in accordance with the present invention described herein.

Referring now to the accompanying drawings, FIG. 1 illustrates the integrated switching module of the pushbutton call transmitter assembly embodying the present invention. It should be understood that the complete call transmitter assembly incorporates a pushbutton faceplate and pushbuttons as illustrated on FIG. 2 and a circuit board with the necessary electronic components as illustrated on FIG. 3, which will be more fully described later according to the sequence of assembly. The integrated switching module comprises a frame 10 which includes a plurality of square apertures like those identified as apertures 11, arranged in an array of longitudinal columns and transverse rows. Each aperture is of a size to accept an individual pushbutton therethrough. Frame 10, further includes a pair of transversely oriented mounting members 12 (only one illustrated) mounted on opposite ends of the frame. Each member 12 includes contact spring member receiving channels 13 thereon. A pair of longitudinally oriented mounting surfaces 14 and 15 arranged opposite each other are situated to a height which will allow bearing plate 20 and electrostatic shield 23 when installed to lie in a common horizontal plane with members 14 and 15.

Bearing plate 23 includes a plurality of circular apertures 24 arranged in longitudinal columns and transverse rows and are adapted to be inserted on the frame over electrostatic shield 20 and between surfaces 14 and 15 with an alignment orifice 25 registered about an alignment bar 16. Each aperture 24 is centrally located to an individual one of frame apertures 11. It should be noted that bearing plate 23 may be composed of any suitable plastic material in either an opaque, or in the case of a lighted dial, a transparent finish, the latter finish acts as a light guide distributing light to the pushbuttons.

Electrostatic shield 20 is installed on frame 10 in the same manner as bearing plate 23 and is composed of a thin piece of metal which functions to prevent foreign matter, sprays and liquids, from fouling the spring contacts and circuit board. As mentioned previously with bearing plate 23 and electrostatic shield 20 installed a common horizontal plane is provided between members 14 and 15.

Contact spring members 30 are each arranged to be inserted over bearing guide 23 with an individual end 36 inserted into a respective and opposite receiving channel 13. Each contact spring member 30 is comprised of a longitudinal conductor strip portion 31 and depending on the amount of pushbuttons either 3 or 4 shallow V-shaped springs and associated contact tongues. The V-shaped spring includes a first leg 32 having one end integrally and flexibly joined to strip 31 and an opposite end integrally joined to one end of a second leg 33. When each contact spring member 30 is installed within respective receiving channels 13 each spring second leg 33 substantially overlays an individual one of apertures 24. The spring further includes a contact tongue 34 which is integrally joined at one end to leg 32 and displaced oppositely of leg 33. Tongue 34 is under direct mechanical control of leg 33. For example, when leg 33 is downwardly displaced, tongue 34 coacts with leg 33 and is displaced downwardly. Finally, each contact spring member 30 also includes an L-shaped wiper contact end 35 which when installed projects outwardly of its respective receiving channel 13 and is disposed to electrically connect each contact spring member to the circuit board. Contact spring members 30 are manufactured as a unitary structure out of a metal having good conductive qualities.

The integrated switching module is completed with backplate 40 which includes alignment members 41 which are adapted to be inserted into receiving channels 13. Backplate 40 further includes contact strips 42 which are transversely oriented on an inner surface of backplate 40. Each contact strip 42 includes a generally U-shaped wiper contact end 43 which is adapted to be snap fitted into a respective accepting notch 44 of backplate edge member 45. When each contact strip is installed in this manner it is aligned with associated contact tongues 34. Contact strips 42 are composed of a suitable conductor material as a unitary structure.

Backplate 40 once installed on frame 10 lies intermediate and flush with mounting members 12. The completed module is securely fastened together employing threaded fasteners 48 which are accepted through counter-sunk mounting holes 46 on backplate 40 to respective threaded bores 17 on frame 10. It should be noted that backplate 40 may also be secured to frame 10 using other conventional techniques of a more permanent nature such as heat staking and the like.

The integrated switching module described previously can now be considered an individual sealed unit and may be applied to various associated pushbuttons, faceplates and circuit boards to complete a specific call transmitter assembly. For instance, with the advance of integrated circuitry it is possible to provide repertory dialing or electronic pulse dialing circuitry on one or two integrated "chips". These of course could be mounted to a circuit board which can be alternatively installed on the integrated switching module depending on the intended functional use of the telephone instrument. In the same manner various types of pushbuttons and faceplates may be alternatively substituted. Such as in the case of a coin operated telephone were metalized vandal proof pushbuttons and faceplates are required to protect the call transmitter from excessive physical abuse. In this manner the necessity and cost of manufacturing a specific call transmitter switching assembly for a specific purpose is negated and a great number of specialized telephone uses can be realized with only the inclusion of the appropriate type of circuit board, pushbuttons and faceplate.

Figure 2:
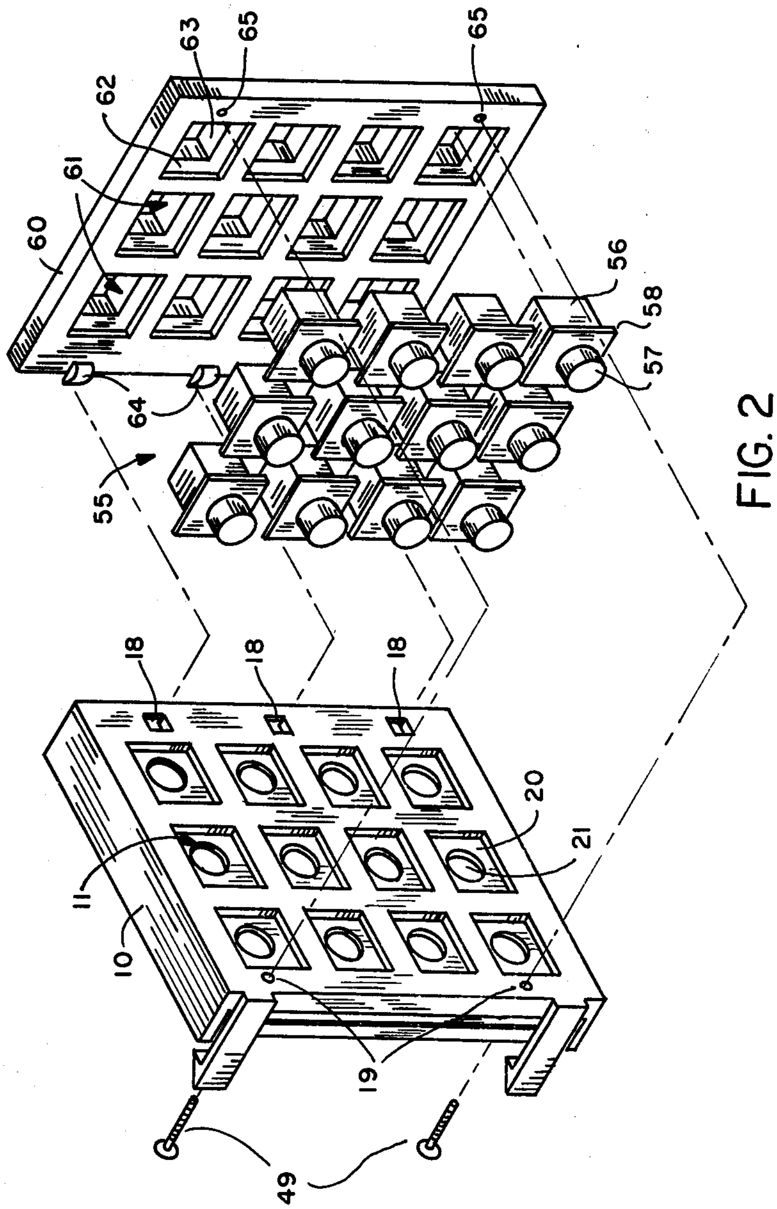
FIG. 2 is a front perspective view of the assembled integrated switching module and an exploded perspective view of the pushbuttons and faceplate separated from one another.

Referring now to FIG. 2, one typical example incorporates pushbuttons 55 and faceplate 60 which can be assembled with the integrated switching module is illustrated. Each of pushbuttons 55 is comprised of an operating section 56, a flange 58 arranged about the perimeter of the operating section and a centrally located actuating section 57. Each pushbutton is disposed to be inserted into a different one of frame apertures 11 with each pushbutton actuating section 57 inserted within its respective bearing guide aperture 24. Electrostatic shield 20 also acts as a stop member which engages the flange 58 and defines the end most limit of downward pushbutton travel. Faceplate 60 includes an array of apertures shown generally as 61 which are in general alignment with the integrated switching modules apertures 11. Each aperture 61 further includes a recessed stop surface 62 which is adapted to define the upper most limit of pushbutton travel and a guide portion 63 which is arranged to guide each pushbutton operating section 56 therethrough. The faceplate and pushbuttons are assembled to the integrated switching module by first placing an individual pushbutton within each aperture 61. Alignment members 64 are then inserted into alignment cavities 18 which properly align apertures 61 to apertures 11 and actuating members 57 to apertures 21. The faceplate is then secured to the integrated switching module by threaded fasteners 49 which are inserted through counter-sunk mounting holes 47 (shown on FIG. 1) on backplate 40, traversing through frame bores 19 and secured to threaded bores 65 on the faceplate. With the faceplate and pushbuttons installed each pushbutton is biased upwardly by a respective spring member second leg 33 which can be seen more clearly on FIG. 4.

Figure 3:
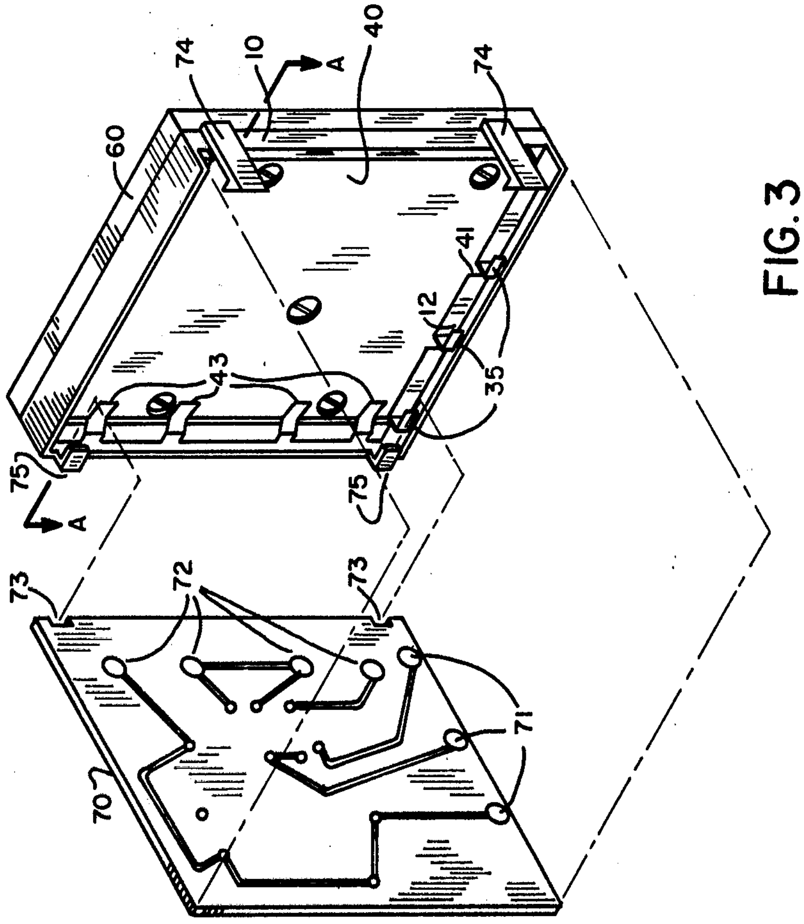
FIG. 3 is a rear perspective view of the assembled integrated switching module and the circuit board separated from one another.

Turning now to FIG. 3 a circuit board 70 is installed to the now assembled integrated switching module and pushbutton assembly by first inserting recesses 73 into alignment arms 75. Arms 75 provide proper alignment for the mutual engagement of contact pads 72 to wiper contact ends 43 and contact pads 71 to wiper contact ends 35, electrically connecting each contact spring member 30 and contact strip 42 to the electronic circuitry on circuit board 70. The circuit board is latched and secured into place by the combined action of alignment arms 75 which holds that respective edge of circuit board 70 and latching arms 74 which interlockingly engage an opposite edge and exterior surface of the circuit board.

Figure 4:
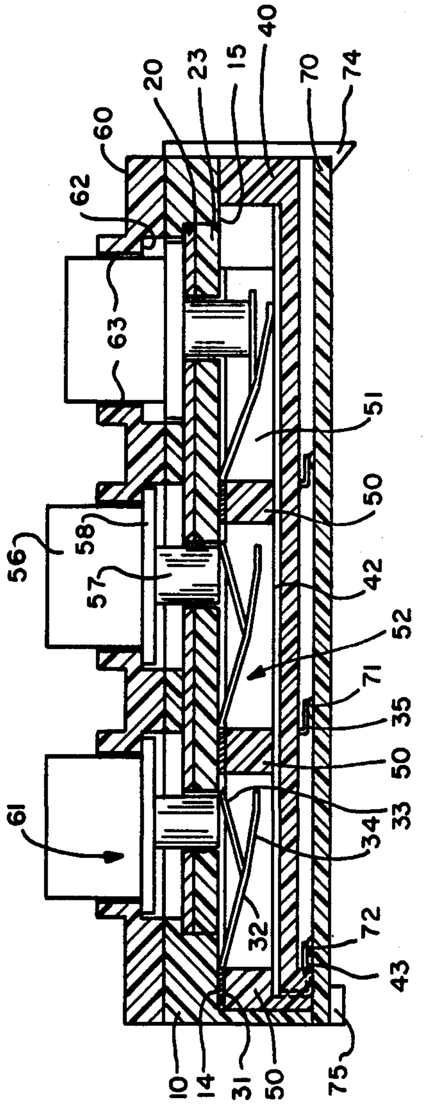
FIG. 4 is a large scale sectional view, of the assembled call transmitter taken substantially along line A—A, of FIG. 3 and including the circuit board installed.

A better understanding of the mechanical operation of the call transmitter assembly may be had by referring now to FIG. 4. In the normal nonoperated condition each pushbutton is biased upwardly by a spring second arm 33 which urges actuator section 57 upward. When manual pressure is applied to the operating section 56 as would be normally used for dialing, the operated pushbutton is displaced downward urging second arm 33 downward and allowing tongue 34 to contact a respective contact strip 42. Upon release of operating section 56 the resilience of first arm 32 urges the actuating section 57 upwards thus returning the pushbutton to its normal non-operated position. Each spring of each contact spring member 30 works independently of the other by virtue of longitudinal and transverse members 50, 51 respectively which form walls about the perimeter of each spring. Walls 50, 51 which are integrally mounted to the interior surface of backplate 40, define an operating cavity shown generally as 52 for each spring and contact tongue. Each longitudinal member 50 holds a individual conductor strip 31 tightly against the horizontal plane formed by mounting surfaces 14 and 15 and bearing guide 23, with transverse members 51 further isolating the action of one spring contact from the other.

The present invention has been described with reference to a specific embodiment thereof, for the purpose of illustrating the matter in which the invention may be used to advantage, it will appreciated by those skilled in the art that the invention is not limited thereto. Accordingly, any and all modifications, variations, or equivalent arrangement which may occur to those skilled in the art should be considered to be within the scope of the invention.

What is claimed is:

1. A pushbutton controlled switching mechanism comprising: a frame having a plurality of apertures therein arranged in an array of longitudinal columns and transverse rows, said frame including inner and outer surfaces and a pair of rectangular members, each of said members transversely oriented and integrally mounted on opposite ends of said frame inner surface, each of said transverse members including a planar bottom surface and a inner side wall, said inner side walls including a plurality of vertically oriented contact spring receiving channels;

a bearing guide mounted to said frame inner surface intermediate said transverse members, including a plurality of apertures arranged in longitudinal columns and transverse rows, each of said bearing guide apertures in central alignment with each of said frame apertures;

a plurality of pushbuttons, each of said pushbuttons adapted to be positioned within a different one of said frame apertures and each including an actuating section positioned within a different one of said bearing guide apertures;

a plurality of contact spring members, each of said contact spring members including a conductor strip portion with first and second ends and a plurality of pushbutton spring means and electrical contact means integrally joined to and coactive with said pushbutton spring means intermediate said conductor portion first and second ends, said conductors second end further including an angularly displaced wiper contact end, each of said contact spring members adapted to be longitudinally mounted intermediate said frame transverse members with said first and second ends inserted within opposite and respective transverse member receiving channels, each of said spring means in general alignment with a respective one of said bearing guide apertures, and associative with one of said pushbutton actuating members, and said wiper contact ends extending inward and over said transverse member bottom surface;

a backplate including an inner and outer surface, said inner surface including a plurality of transversely oriented parallel and spaced apart contact strips, each contact strip further including a formed wiper contact end, each of said wiper contact ends terminating over said backplate outer surface, said backplate adapted to be mounted to said frame intermediate said transverse members with said contact strips in general alignment with said contact means;

a printed circuit board including a face having a plurality of contact areas adapted to be mounted to said frame with said contact areas communicating with said contact spring wiper ends and said contact strips wiper ends;

said pushbuttons each normally biased upwardly by said pushbutton spring means, and an individual one of said contact means operated upon application of manual pressure to one of said pushbuttons causing said included actuating section to displace said associated pushbutton spring means and urge said contact means into contact with said respective contact strip.

2. A pushbutton controlled switching mechanism as recited in claim 1, wherein: said bearing guide includes a planar exterior surface, each of said pushbuttons including a rectangular operating section integrally joined and extending outwardly from said actuator section and further including a flange having first and second surfaces intermediate said operating section and said actuating section extending about the periphery of said pushbutton, said flange second surface adapted to engage said bearing guide exterior surface and define the end most limit of downward travel of said pushbutton when operated.

3. A pushbutton controlled switching mechanism as recited in claim 2, wherein: there is provided a pushbutton faceplate having inner and outer surfaces, and a plurality of apertures therethrough, arranged in longitudinal columns and transverse rows, each of said apertures encompassed by a guide collar extending perpendicularly from said outer surface to a predetermined height and adapted to guide and contain one of said pushbutton operating sections therein.

4. A pushbutton controlled switching mechanism as recited in claim 3, wherein: said faceplate inner surface includes recessed portions encompassing each aperture and adapted to engage said pushbutton flange first surface therein, defining the end most limit of upward travel of each pushbutton when each pushbutton is non-operated.

5. A pushbutton controlled switching mechanism as recited in claim 1, wherein: each of said spring means perpendicularly oriented to said conductor portion and comprising a shallow V-shaped spring member, including a first leg having one end flexibly joined to said conductor portion and an opposite end flexibly and integrally joined to one end of a second leg, an opposite end of said second leg communicating with said bearing guide with said second leg substantially overlaying said respective bearing guide aperture.

6. A pushbutton controlled switching mechanism as recited in claim 5, wherein: each of said contact means comprises a angularly displaced tongue including a first end flexibly and integrally joined to said V-shaped spring member first leg opposite end and a second end terminating away from said bearing guide, said tongue under mechanical control of said spring means second leg.

7. A pushbutton activated switching assembly arranged as a singular aggregate and adapted to conjoin with a pushbutton face plate having at least one pushbutton disposed therein and a circuit board having a face with at least two contact areas thereon, said pushbutton activated switching assembly comprising:

a frame including top and botton surfaces and at least one aperture therethrough;

a pair of walls mounted perpendicular on opposite edges of said frame botton surface each wall including at least one receiving channel thereon;

a bearing guide including top and botton surfaces, said top surface overlaying said frame bottom surface and intermediate said pair of walls said bearing guide including at least one aperture therethrough in general alignment with said frame aperture;

at least one contact spring member, said contact spring member including a conductor strip portion with first and second ends and at least one resilient spring means, and an electrical contact means adjacent to and coactive with said spring means intermediate said conductor strip portion first and second ends, said spring member adapted to be mounted on said bearing guide bottom surface intermediate said pair of walls with said conductor portion first and second ends inserted within opposite and respective wall receiving channels, said spring means overlaying and in general alignment with said bearing guide aperture;

an L-shaped wiper contact end having a first leg integrally joined and perpendicular to said conductor strip portion second end, oriented outwardly of said wall receiving channel and a second leg oriented perpendicular to said first leg;

a backplate including top and bottom surfaces said top surface including at least one contact strip, said contact strip including a formed wiper contact end, said wiper contact end terminating over said backplate bottom surface, said backplate adapted to be mounted intermediate said walls with said top surface contact strip in general alignment with said contact means, said contact strip wiper end in a mutual plane with said contact spring wiper end;

said circuit board face adapted to be mounted to said backplate bottom surface, said contact spring wiper end second leg and said contact strip wiper end communicating with a respective circuit board contact area providing an electrical connection thereat, and said pushbutton faceplate and said pushbutton mounted to said frame top surface and adapted upon manual application of pressure to said pushbutton to displace said spring means urging said contact means into communication with said contact strip to complete an electrical path thereat.

8. A pushbutton activated switching assembly as recited in claim 7, wherein: there is further included an electrostatic shield having at least one aperture therethrough and mounted between said frame and said bearing guide, said electrostatic shield aperture in general alignment with said bearing guide aperture.

9. A pushbutton activated switching assembly as recited in claim 7, wherein: said backplate includes at least two alignment members integrally mounted on opposite ends of said backplate in general correspondence with each of said wall receiving channels and disposed to be inserted within said channels providing for proper alignment of said contact strip to said contact means.

10. A pushbutton activated switching assembly as recited in claim 7, wherein: said backplate includes mounting means disposed to conjoin with respective mounting means on said frame arranged to secure said backplate to said frame uniting said assembly into a singular aggregate.

11. A pushbutton activated switching assembly as recited in claim 7, wherein: said frame top surface includes at least one alignment cavity and frame bore arranged opposite of each other and said pushbutton faceplate includes an alignment member and a threaded bore, said alignment member adapted to interlockingly engage said alignment cavity allowing said pushbutton faceplate to be properly positioned on said frame and said pushbutton accepted within said frame aperture, said threaded bore in general alignment with said frame bore.

12. A pushbutton activated switching assembly as recited in claim 11, wherein: said backplate includes a counter-sunk mounting hole in general alignment with said frame bore and disposed to accept a threaded fastener therein, said threaded fastener traversing through said frame bore and engaging said faceplate threaded bore, securing said faceplate to said assembly.

13. A pushbutton activated switching assembly as recited in claim 7, wherein: said frame bottom surface includes a pair of perpendicularly oriented alignment arms, and a pair of perpendicularly oriented latching arms, each of said latching arms directly opposite one of said alignment arms, said alignment arms adapted to accept one edge of said circuit board therein and said latching arms adapted to interlockingly engage an opposite edge of said circuit board securing said circuit board to said backplate.

* * * * *